UNITED STATES PATENT OFFICE.

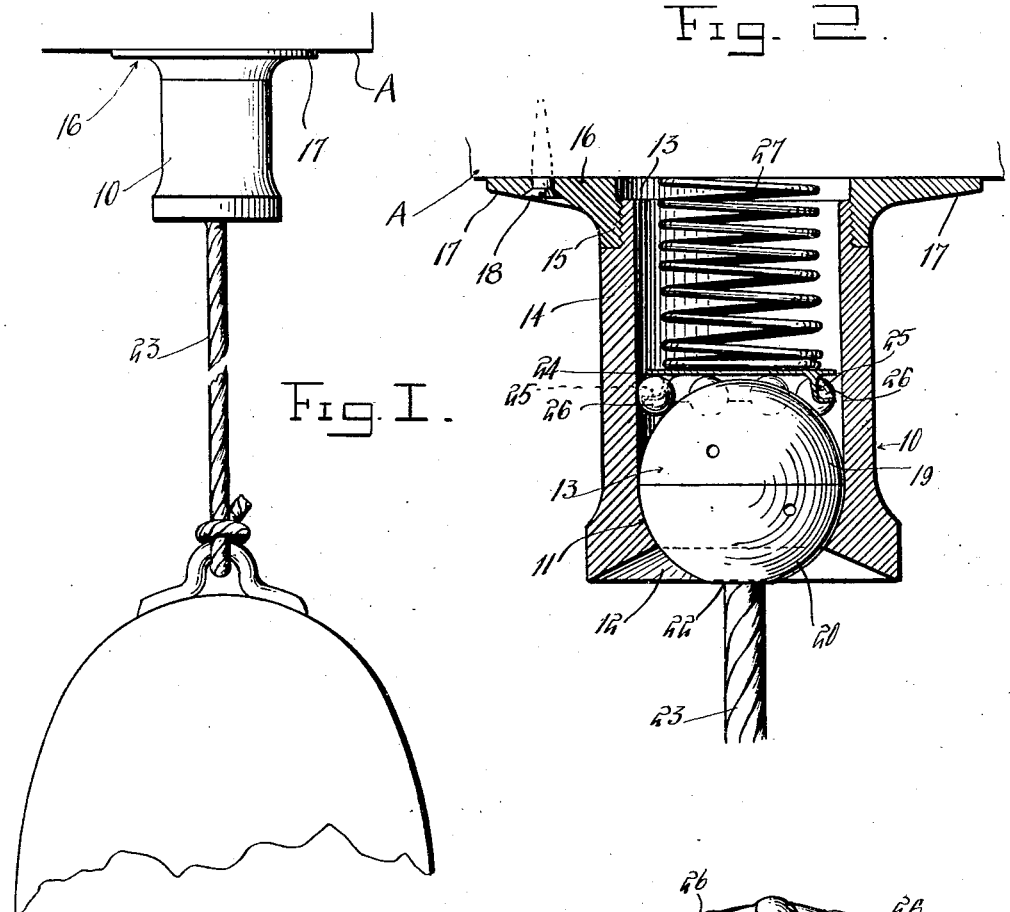
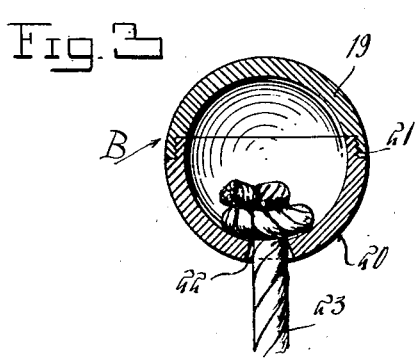
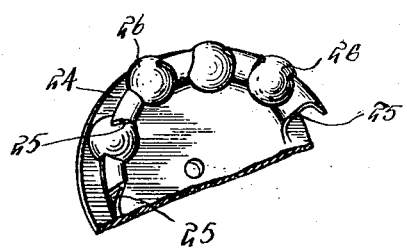

ANTON E. WALTER, OF SULTAN, WASHINGTON.

SUPPORT FOR PUNCHING-BAGS.

1,050,501.  Specification of Letters Patent.  Patented Jan. 14, 1913.

Application filed July 31, 1912. Serial No. 712,501.

*To all whom it may concern:*

Be it known that I, ANTON E. WALTER, a citizen of the United States, residing at Sultan, in the county of Snohomish, State of Washington, have invented certain new and useful Improvements in Supports for Punching-Bags; and I do hereby declare the following to be a full, clear, and exact description of the invention, such as will enable others skilled in the art to which it appertains to make and use the same.

This invention relates to supports for what is commonly known as "punching bags" or "striking bags".

The object of the invention resides in the provision of a support of the character named which will reduce friction to a minimum between the movable parts of the support and which will also prevent the suspension rope from being worn or cut during violent and rapid movements of the bag.

With the above and other objects in view the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which—

Figure 1 is a view in elevation showing a punching bag suspended through the medium of the support, Fig. 2, a longitudinal vertical section through the support, same being shown on an enlarged scale, Fig. 3, a transverse section through the ball member of the support, and Fig. 4, a fragmental detail perspective view of the bearing which coöperates with the ball member of the support.

Referring to the drawings A indicates a ceiling or other suitable member to which the support is adapted to be secured. The support proper is shown as comprising a tubular body portion 10 the bore of which is contracted adjacent one end as at 11 and then flared as at 12. The end of the bore of the body portion 10 remote from the contracted portion 11 is enlarged as at 13 and seated in this enlarged portion of the bore is a tubular member 14 the outer end of which is exteriorly threaded as at 15. This tubular member 14 is shrunk within the body 10 so as to be rigidly secured to the latter and has its inner wall in registration with the inner wall of the body 10. Engaged on the threads 15 is a collar 16 provided at its outer end with a flange 17 which bears against the member A and is secured to the latter through the medium of suitable securing elements 18. Disposed within the bore of the body 10 and seating upon the contracted portion 11 thereof is a hollow ball B. This ball B is formed of a pair of sections 19 and 20 threaded together as at 21. The section 20 is provided with an opening 22 through which extends the extension rope 23 of the punching bag, said rope being knotted within the ball B to prevent the disengagement thereof from the ball. Disposed within the bore of the body 10 is a follower bearing 24. This bearing 24 is provided with a plurality of sockets 25 in each of which is disposed a ball bearing 26. This follower bearing 24 is constantly forced toward the ball B by a spring 27 one end of which engages the member A while the other end thereof engages the follower bearing 24. The balls 26 are engaged both by the ball B and by the inner wall of the body 10. As a result of the follower bearing 24 pressing down upon the ball B, it will be apparent that the latter will be held firmly to its seat upon the contracted portion 11 of the bore of the body 10, while the balls 26 will reduce the friction between the ball B and the follower bearing 24 to a minimum.

What is claimed is:

In a support for punching bags the combination of a suspension element, a tubular body having one end of its bore contracted and then flared, means for securing the end of the tubular member remote from the contracted bore to the suspension element, a hollow ball disposed within the ball of the tubular member and seating upon the wall of the contracted bore, a bag suspending rope having one end secured within the ball and extending through the flared end of the bore of the tubular member, a plurality of ball bearings carried by said follower member and engaging said hollow ball and the wall of the bore of the tubular member, and spring means disposed within the tubular member constantly tending to force the follower member toward the hollow ball.

In testimony whereof, I affix my signature, in presence of two witnesses.

ANTON E. WALTER.

Witnesses:
ANDREW ENGESET,
CHAS. RATKIE.